United States Patent [19]

Callister et al.

[11] Patent Number: 5,222,200

[45] Date of Patent: Jun. 22, 1993

[54] AUTOMATIC PRINTER DATA STREAM LANGUAGE DETERMINATION

[75] Inventors: David B. Callister; James D. Lewis, both of Lexington; Mark L. Mayberry, Nicholasville; Stephen R. Troyer; James F. Webb, both of Lexington, all of Ky.

[73] Assignee: Lexmark International, Inc., Greenwich, Conn.

[21] Appl. No.: 818,311

[22] Filed: Jan. 8, 1992

[51] Int. Cl.$^5$ ............................................. G06K 15/00
[52] U.S. Cl. ..................................... 395/112; 395/114
[58] Field of Search ............... 345/114, 112, 325, 500, 345/101; 358/442, 467; 400/61, 76; 346/157

[56] References Cited

U.S. PATENT DOCUMENTS 4,992,957  2/1991  Aoyama et al. ..................... 395/114
5,075,874 12/1991  Steeves et al. ..................... 395/112
5,165,014 11/1992  Vassar ................................... 395/112

*Primary Examiner*—Arthur G. Evans
*Attorney, Agent, or Firm*—John A. Brady

[57] ABSTRACT

Printer (1) monitors current control language being interpreted for end of page and end of job codes, depending upon the language. Upon observing such commands, up to 500 bytes in buffer memory (19) are observed for command codes characteristic of specific languages. ASCII language is recognized by any one of several command codes, many of which have ESC. PostScript language is recognized by any one of several commands including the ASCII sequence of the percent sign. PCL4 or PCL5 and pen movement graphics languages are also recognized. Operator intervention and special coding defining the language are completely avoided.

20 Claims, 1 Drawing Sheet

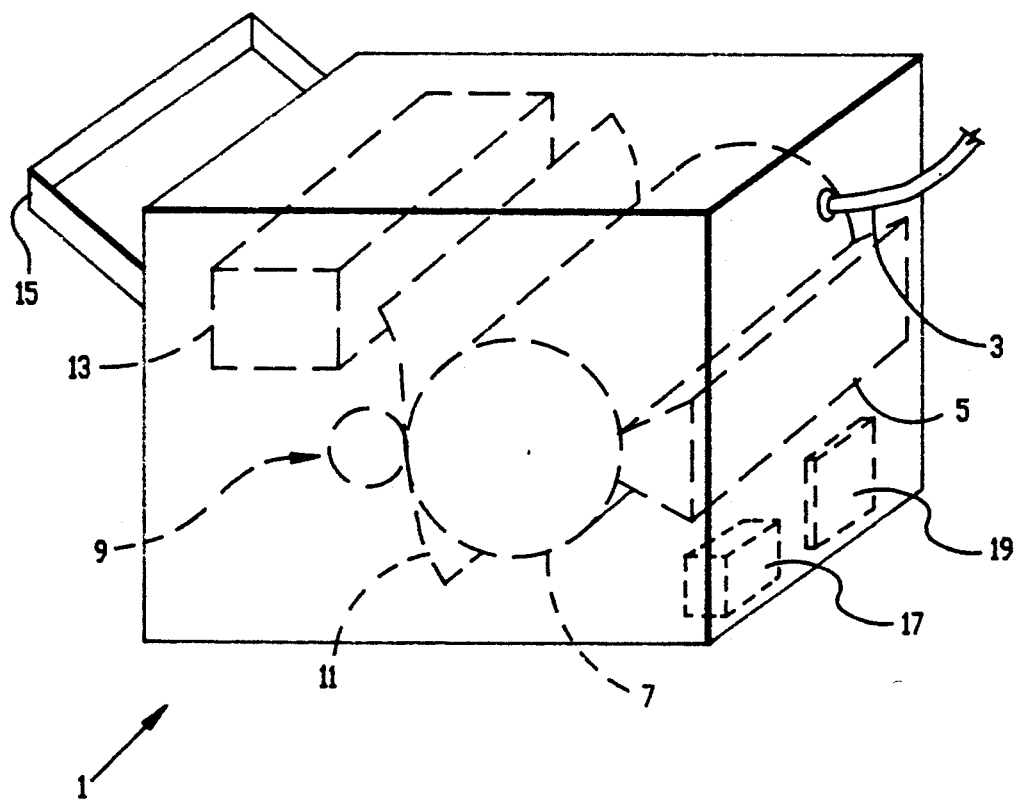

AUTOMATIC PRINTER DATA STREAM LANGUAGE DETERMINATION

DESCRIPTION

Technical Field

This invention relates to printers having internal data stream processing capability by which the content and form of the printing is determined. Such printers may receive data in more than one set of meanings for binary data received, each set constituting a control language for the printer. This invention involves processing of binary data received by the printer to automatically set the printer to recognize the language being received, thereby eliminating the need for manual entry or a preliminary instruction in the data identifying the language.

Background of the Invention

Established printer data stream languages include ASCII (including PPDS, an enhanced ASCII language), PostScript, graphics identified as Hewlett-Packard (HP) or IBM, which are identical for the present purposes, and printer command languages identified as for Hewlett-Packard printers, commonly known as PCL (specifically, PCL4 and PCL5, which is enhanced over PCL4). All of these languages are binary sequences of ones and zeros.

ASCII printer language employs in machine readable form the common ASCII codes for their ASCII meaning. Thus, a sequence of ones and zeros of 0,1,0,0,0,0,1,1; which is 43 in hexadecimal notation (hex 43), is interpreted as the character C since that is the meaning in ASCII. A number of printer function commands are added to the common ASCII definitions to form function control instructions. Many of these begin with the ASCII code for ESC (termed escape), hex 1B, followed immediately with another code.

PostScript printer language is code written in the form required by a PostScript interpreter, a trademark product of Adobe Systems Incorporated. This language provides for considerable variation in the form of the final printed page, the size of the characters on the final page, and other matters generally associated with stylized printing rather than correspondence. The PostScript language is often termed a page description language. The PostScript language does not use the ESC code.

The IBM (or HP) Graphics Language originates from an objective to direct a mechanically moved pen or the like to draw shapes. These shapes may be alphabetic characters, but that is typically incidental, and the primary use is to depict a wide range of variations of form, shapes, shading and arrangement, basically like an artist's drawings. This does use the ESC code.

The PCL4 and PCL5 printer languages contain characters as individual codes and also considerable page description information. They do use certain commands having the ESC code.

Many users of printers employ data originated from various sources in different printer control languages. It is now common to provide printers with the capability of responding to more than one language. A standard method of setting such a printer to recognize the current language to be transmitted is by manual entry to a control panel of the printer. Another existing technique is to precede any new data with a separate binary message recognized by the printer as stating what language follows. Both of these require some form of preparation or human intervention with any change in the language to which the printer is set.

This invention requires no preliminary action since recognition of a change in language is automatically determined in the printer. At least one printer is known to claim automatic recognition of languages, but it is believed to rely on delay between messages as the essential indication that the language may have changed. This is slow and imprecise. Moreover, no previous solution is known for automatically determining between the PPDS and PCL languages. Other printers which seem to offer switching between languages are believed to actually function by special message as above mentioned.

DISCLOSURE OF THE INVENTION

In accordance with this invention, as the current language is interpreted, selected conditions characteristic of a potential end of job in that language are monitored. In response to the selected conditions being recognized, a language determination routine is called which monitors the subsequent code for characteristics of the various languages. In response to such a characteristic being observed, a routine is called which sets the printer to interpret the language to which the characteristic is unique. Some languages, such as PostScript, have a code unique to end of job, and when the current language is PostScript, that code is monitored to initiate the language determination routine. Other languages do not have such a code, but they all have a condition in which a page is being fed, which is the condition monitored to initiate the language determination routine. In those languages, the examination for a change in language is invariably at the end of job, since paper feed occurs at that point, but the determination routine is not executed so frequently that the examining of code significantly slows printing or burdens data processing capabilities. The language determination routine is also executed at power on, reset, and the like, which are characteristic of a new printing job.

BRIEF DESCRIPTION OF THE DRAWING

The details of this invention will be described in connection with the accompanying drawing which illustrates a printer having automatic language determination in accordance with this invention.

BEST MODE FOR CARRYING OUT THE INVENTION

Page information is received by printer 1 in a standard manner from a communications cable 3. Printer 1 may be any suitable printer. For illustrative purposes printer 1 is shown suggestive of an electrophotographic printer having an optical system 5 operative on drum 7. Drum 7 transfers image defined by optical system 5 at transfer station 9 to paper 11. The image is fixed, typically by heat, at fixing station 13, and the finished printed page is delivered to output tray 15.

Data processor 17 in printer 1 monitors the data received and interprets the data in accordance to the control language to which the data processor is set. Information received on cable 3, as well as other information, is stored electronically in memory 19.

The printer 1 contemplated as the preferred embodiment of this invention has a memory 19 which provides 500 byte buffer (of eight bit bytes) in which data received for printing is entered for subsequent processing and for storing such data which the printer can not use immediately. Examination of data for automatic language determination is limited to 500 bytes, by standard counting of bytes observed by data processor 17, but null commands (hex 00, interpreted as "do nothing") are ignored since nulls are often sent between jobs.

Assuming that the data processor 17 of printer 1 is set to recognize PPDS language, normally, at some point the data received will contain the consecutive code bits 0,0,0,0,1,1,0,0 (hex 0C), which specifies in PPDS the feeding of the output page. That condition creates a page feed initiation which is responded to by the data processor 17 of printer 1 to examine up to the next 500 non-null bytes in the buffer of received data for predetermined unique characteristics of a control language.

This embodiment uses the existing capability of the printer to perform the monitoring for end of page. The previous printer generated a system call signal to execute the page feed and stored location information indicative for the start of information for the next page. This preferred embodiment places the language determination routine at the location called by the end of page determination logic that is a basic part of the previous printer, and the language determination routine terminates with a call to the page feed routine. The location information for start of next page is used as the starting point in the buffer for sending 500 bytes of data to determine the language.

If no characteristic of a language is observed in the 500 bytes, a default is automatic, which, when the previous language is PPDS, is for data processor 17 to remain set for PPDS. Similarly, if no language is recognized from the 500 bytes when the previous language is PCL4 or PCL5, the default is to return data processor 17 to the setting for the previous PCL4 or PCL5. When the previous language was PostScript or Graphics, failure to recognize a language characteristics is highly indicative that the data was not in the PostScript or Graphics language, and the default is to set data processor 17 for PPDS. In any case this can be overridden by an operator entry at a printer control panel (not shown) of printer 1. Also, where no data is received for an extended period, this is measured, and the setting is reverted as described in this paragraph for when no characteristic of a language is found.

This preferred embodiment senses between the following four languages: ASCII (actually PPDS, but identical for this purpose), IBM Graphics, PCL4 (and PCL5, which is identical for this purpose) and PostScript. The following command codes have been determined in accordance with this invention to be characteristic of only one of the languages and the sensing of any one of these commands within the 500 bytes sensed is responded to by setting the data processing system of the printer to interpret the commands as in the language to which they are characteristic.

Command abbreviations are in hexadecimal notation (hex) unless otherwise noted.

Characteristic commands for ASCII language: 1B5B (ESC, Left Bracket); 1Bx with x being any of hex 41 through hex 58 except hex 45 (includes underline, select 10 pitch, bold, 9 pin graphic commands; 1B45 is used by PCL4); and 1B30[any two byte number]31z with z less than 10 (download commands with the any number specifying the size of the download and z designated the type of download such as character or header information). These commands total 37 of the total 71 commands of the PPDS language.

Characteristic commands for PCL4 language: 1B26 (Paper Handling); 1B2A (Font and Rig and Macro commands); 1B28 (Font Selection); and 1B29 (Font Selection). These commands total 60 of the total 75 commands of PCL4.

Characteristic, commands for IBM Graphics language: 1B2E (Hardware Initialization); IN; (in ASCII, any capitalization) (initialize); DF; (in ASCII, any capitalization) (defaults); PD[any number]; (in ASCII, any capitalization (Pen Down); SP; and SP[any number]; (in ASCII, any capitalization) (Select Pen); and PG[any number]; (in ASCII any capitalization) (Page Eject). These are a small number of the total commands of this language, but they are selected to be those frequently occurring early in most page descriptions.

Characteristic commands for the PostScript language: %! or %% (in ASCII, comments); }def (in ASCII) (part of To logical grouping); }def (in ASCII) (part of To logical grouping); bind def (in ASCII) (part of To logical grouping); dict begin (in ASCII) (part of Create Library command); and findfont (in ASCII) (Font Selection command), and 04 (end of job). These are a small number of the total commands of this language, but they are selected to be those frequently occurring early in most page descriptions.

The hexadecimal 04 character is used in both the language determination routine and when set to interpret the PostScript language, as the command monitored to call the language determination routine. When data received from the host computer is being examined by the language determination routine, the presence of the 04 character within the first 500 non-null bytes results in PostScript language being selected. This is valid since any of the other data streams that can contain an 04 character will have had a previous command sequence that would have already selected PPDS or PCL.

The occurrence of an 04 character within a job being interpreted in the PostScript language identifies the end of that job. The previous printer issued a call to a routine which terminated the job. This invention places the language determination routine at the location of that call and terminates the language determination with a call to the routine which terminated the job.

The ASCII and PCL languages both use hexadecimal 0C as the form feed character. Their presence during language interpretation defines a potential end of job as previously discussed, and is responded to by the pre-existing call to the paper feed routine being used to actually call the language determination routine. Their presence during the language determination routine is consistent with the preceding code being in only one or the other of PPDS and PCL since 0C is not found in the other two languages. Presence of 0C in the language determination is responded to by immediately selecting PPDS with the one exception that PCL is immediately selected if that was the last active mode. PPDS is preferred because it is the most commonly used language of the two in the preferred embodiment.

IBM Graphics language uses ASCII PG; in any capitalization as a page feed, and it is any such code to which this preferred system reacts when interpreting in IBM Graphics to cause examination of the next 500 non-null bytes for determination of a possible new language. As with other languages in this implementation, the pre-existing call to the paper feed routine is used to actually call the language determination routine as described in the foregoing.

Since in the languages interpreted, only the end of job code in PostScript and the page feed codes in the other languages result in the language determination routine being called, this occurs a limited number of times as described and therefore does not significantly burden the speed and data processing requirement of the system. In examining the 500 bytes of data as described, the language determination routine never consumes data and that data is used by the language selected as needed to compose printing.

It should be recognized, however, that call of the language determination routine can be based on different factors for different language, not all necessarily only leading to a page pick call, and that such other factors can be used to call the language determination routine.

It will be apparent that any standard data processing system, such as now-common, general purpose microprocessors, may execute the determinations as described, and that, in fact, the typical printers sold today need only have their internal control code modified to practice this invention. Accordingly, the printer and the data processing capabilities necessary to practice this invention will not be further elaborated upon.

We claim:

1. A printer comprising: data processing apparatus to interpret a plurality of binary printer control languages, means to set said data processing apparatus to interpret to recognize data received in a selected one of said languages, said data processing apparatus to interpret when set to recognize one of said languages creating a first response condition upon receipt of at least one command code in the language to which it is set which is characteristic of possible end of printing, data processing apparatus responsive to said first response condition to monitor a predetermined sequence of subsequent data received by said printer for at least one command code characteristic of each one of said languages to create one of a set of response conditions, each of said set being unique to different ones of said languages, and means responsive to said one of said set to set said data processing apparatus to interpret to recognize the language to which said one of said set is unique.

2. The printer as in claim 1 in which said languages include PostScript and said command code characteristic of PostScript language includes hexadecimal 04.

3. The printer as in claim 1 in which said languages include ASCII and PCL, said command code characteristic of ASCII language and PCL language each include hexadecimal OC, and said means responsive to said one of said set responds to said OC to set to PCL when the immediately prior setting was PCL and to set to ASCII for said immediately prior setting being for any other language.

4. The printer as in claim 1 in which said languages are ASCII and PostScript and said command code characteristic of possible end of printing for ASCII is only the command code for paper feed and said command code characteristic of possible end of printing for PostScript is only the command code for end of job.

5. The printer as in claim 4 in which said command code characteristic of ASCII language includes commands having ESC and said command code characteristic of PostScript language includes %.

6. The printer as in claim 5 in which said languages also include PCL4 or PCL5 and said command code characteristic of possible end of printing for PCL4 or PCL5 is only the command code for paper feed.

7. The printer as in claim 6 in which said languages also include graphics directing pen movement and said command code characteristic of possible end of printing for said graphics directing pen movement language is only the command code for page feed.

8. The printer as in claim 7 in which said command code characteristic of graphics language includes any one of hardware initialization, initialize, defaults, pen down and select pen.

9. The printer as in claim 8 in which said command code characteristic of PostScript language includes hexadecimal 04.

10. The printer as in claim 8 in which said command code characteristic of ASCII language and PCL language each include hexadecimal OC, and said means responsive to said one of said set responds to said OC to set to PCL when the immediately prior setting was PCL and to set to ASCII for said immediately prior setting being for any other language.

11. A printer comprising a buffer memory to store at least six hundred four-bit bytes of received binary printer control data, data processing apparatus having different interpretation routines to recognize data received from said buffer memory in different printer control languages, one of said interpretation routines recognizing one of said control languages, each said interpretation routines creating a first call condition upon receipt of at least one command code in the language it recognizes which is characteristic of possible end of printing, data processing apparatus having a routine activated by said first call condition to monitor up to at least all of said bytes of data from said buffer memory for at least one command code characteristic of each one of said languages to create one of a set of call conditions, each of said set being unique to different ones of said languages, and each one of said set activating one of said interpretation routines which interprets the language to which said one of said set is unique.

12. The printer as in claim 11 in which said languages include PostScript and said command code characteristic of PostScript language includes hexadecimal 04.

13. The printer as in claim 11 in which said languages include ASCII and PCL, said command code characteristic of ASCII language and PCL language each include hexadecimal OC, and said means responsive to said one of said set responds to said OC to set to PCL when the immediately prior setting was PCL and to set to ASCII for said immediately prior setting being for any other language.

14. The printer as in claim 11 in which said languages are ASCII and PostScript and said command code characteristic of possible end of printing for ASCII is only the command code for paper feed and said command code characteristic of possible end of printing for PostScript is only the command code for end of job.

15. The printer as in claim 14 in which said command code characteristic of ASCII language includes commands having ESC and said command code characteristic of PostScript language includes %.

16. The printer as in claim 15 in which said languages also include PCL4 or PCL5 and said command code call characteristic of possible end of printing for PCL4 or PCL5 is only the command code for paper feed.

17. The printer as in claim 16 in which said languages also include graphics directing pen movement and said command code characteristic of possible end of printing for said graphics directing pen movement language is only the command code for page feed.

18. The printer as in claim 17 in which said command code characteristic of graphics language includes any one of hardware initialization, initialize, defaults, pen down and select pen.

19. The printer as in claim 18 in which said command code characteristic of PostScript language includes hexadecimal 04.

20. The printer as in claim 18 in which said command code characteristic of ASCII language and PCL language each include hexadecimal OC and said means responsive to said one of said set responds to said OC to set to PCL when the immediately prior setting was PCL and to set to ASCII for said immediately prior setting being for any other language.

* * * * *